US008077396B2

(12) United States Patent
Croy et al.

(10) Patent No.: US 8,077,396 B2
(45) Date of Patent: Dec. 13, 2011

(54) APPARATUS AND SYSTEM FOR PROVIDING A VIRTUAL DISPLAY FOR A VEHICLE

(75) Inventors: Jean-Luc Croy, Limeil Brévannes (FR); Phillipe Fedorawiez, Triel sur Seine (FR); Jean-Marie Bariller, Sablé-sur-Sarthe (FR); Christophe Guedet, Sagigné L'Eveque (FR)

(73) Assignee: Johnson Controls Technology Company, Holland, MI (US)

( * ) Notice: Subject to any disclaimer, the term of this patent is extended or adjusted under 35 U.S.C. 154(b) by 126 days.

(21) Appl. No.: 12/515,394

(22) PCT Filed: Nov. 20, 2007

(86) PCT No.: PCT/US2007/024239
§ 371 (c)(1),
(2), (4) Date: May 18, 2009

(87) PCT Pub. No.: WO2008/063632
PCT Pub. Date: May 29, 2008

(65) Prior Publication Data
US 2010/0046082 A1  Feb. 25, 2010

Related U.S. Application Data

(60) Provisional application No. 60/860,140, filed on Nov. 20, 2006.

(51) Int. Cl.
*G02B 27/14* (2006.01)
(52) U.S. Cl. ...................................................... 359/632
(58) Field of Classification Search ............. 359/12–15, 359/630–632; 345/7–8
See application file for complete search history.

(56) References Cited

U.S. PATENT DOCUMENTS

| 4,831,366 | A | * | 5/1989 | Iino .................................... 345/7 |
| 5,204,666 | A | * | 4/1993 | Aoki et al. ......................... 345/9 |
| 5,457,575 | A | | 10/1995 | Groves et al. |
| 5,748,346 | A | | 5/1998 | David et al. |
| 5,905,477 | A | * | 5/1999 | Kuwayama et al. ............... 345/7 |
| 2002/0012173 | A1 | | 1/2002 | Aoki et al. |
| 2002/0167189 | A1 | | 11/2002 | Nakamura et al. |
| 2005/0024490 | A1 | | 2/2005 | Harada et al. |
| 2006/0000955 | A1 | * | 1/2006 | Cvek ............................. 248/161 |
| 2008/0285138 | A1 | | 11/2008 | Lebreton |

FOREIGN PATENT DOCUMENTS

CN  101346253 A  1/2009
EP  0824216 A1  2/1998

(Continued)

OTHER PUBLICATIONS

International Search Report and Written Opinion for International Patent Application No. PCT/US2007/024239 mailed Aug. 5, 2008, 20 pages.
Chinese Office Action for CN2007-80049317.2, dated Mar. 30, 2011, 9 pages.

(Continued)

*Primary Examiner* — Scott J Sugarman
*Assistant Examiner* — Vipin Patel
(74) *Attorney, Agent, or Firm* — Foley & Lardner LLP

(57) ABSTRACT

A display unit for mounting in a vehicle is provided. The display unit includes an image generator. The display unit further includes a semi-reflective member. The semi-reflective member is configured to move from a non-operational position to an operation position. The semi-reflective member is positioned to reflect light from the image generator in an operational position.

18 Claims, 19 Drawing Sheets

FOREIGN PATENT DOCUMENTS

| | | |
|---|---|---|
| FR | 2559278 A1 | 8/1985 |
| GB | 2348858 A | 10/2000 |
| WO | WO-2005/124741 | 12/2005 |
| WO | WO 2008/063632 | 5/2008 |

OTHER PUBLICATIONS

Unofficial Translation of Chinese Office Action for CN2007-80049317.2, dated Jun. 14, 2011, 9 pages.

* cited by examiner

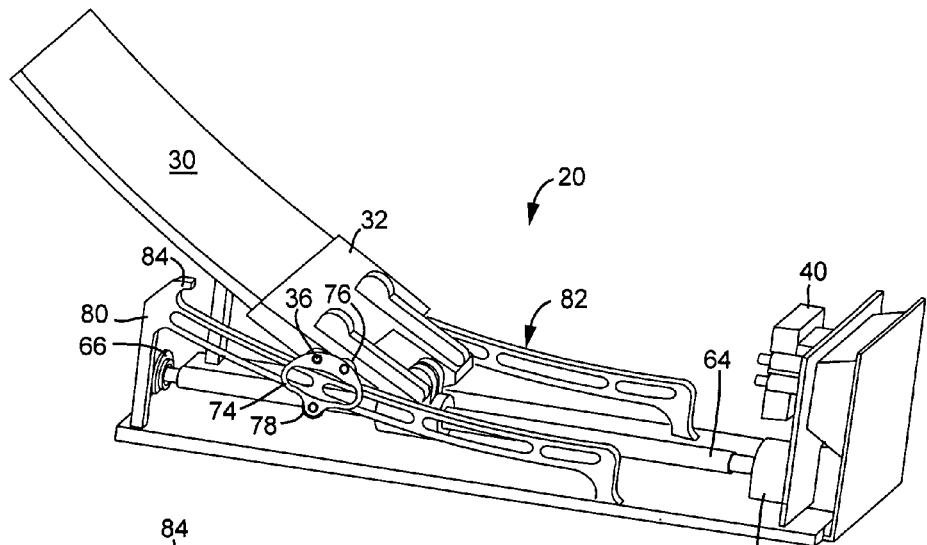
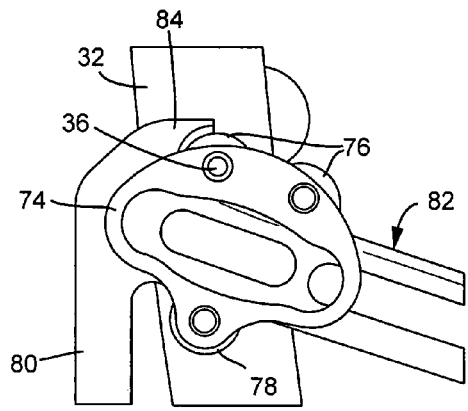
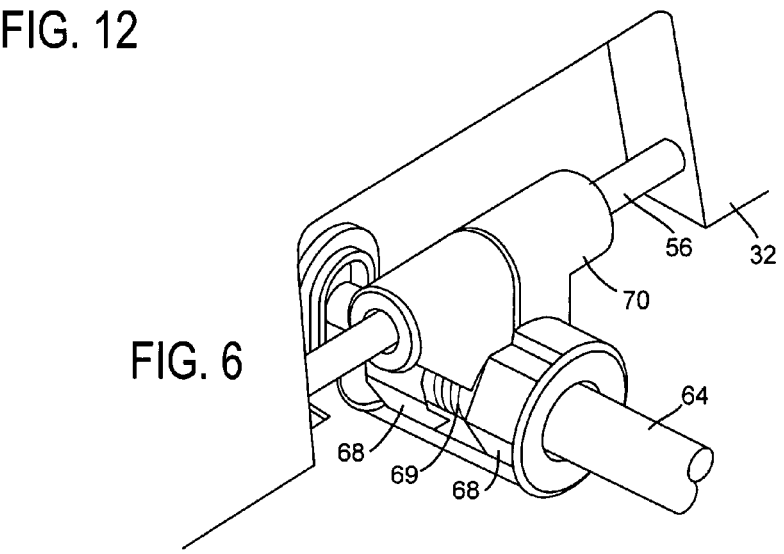

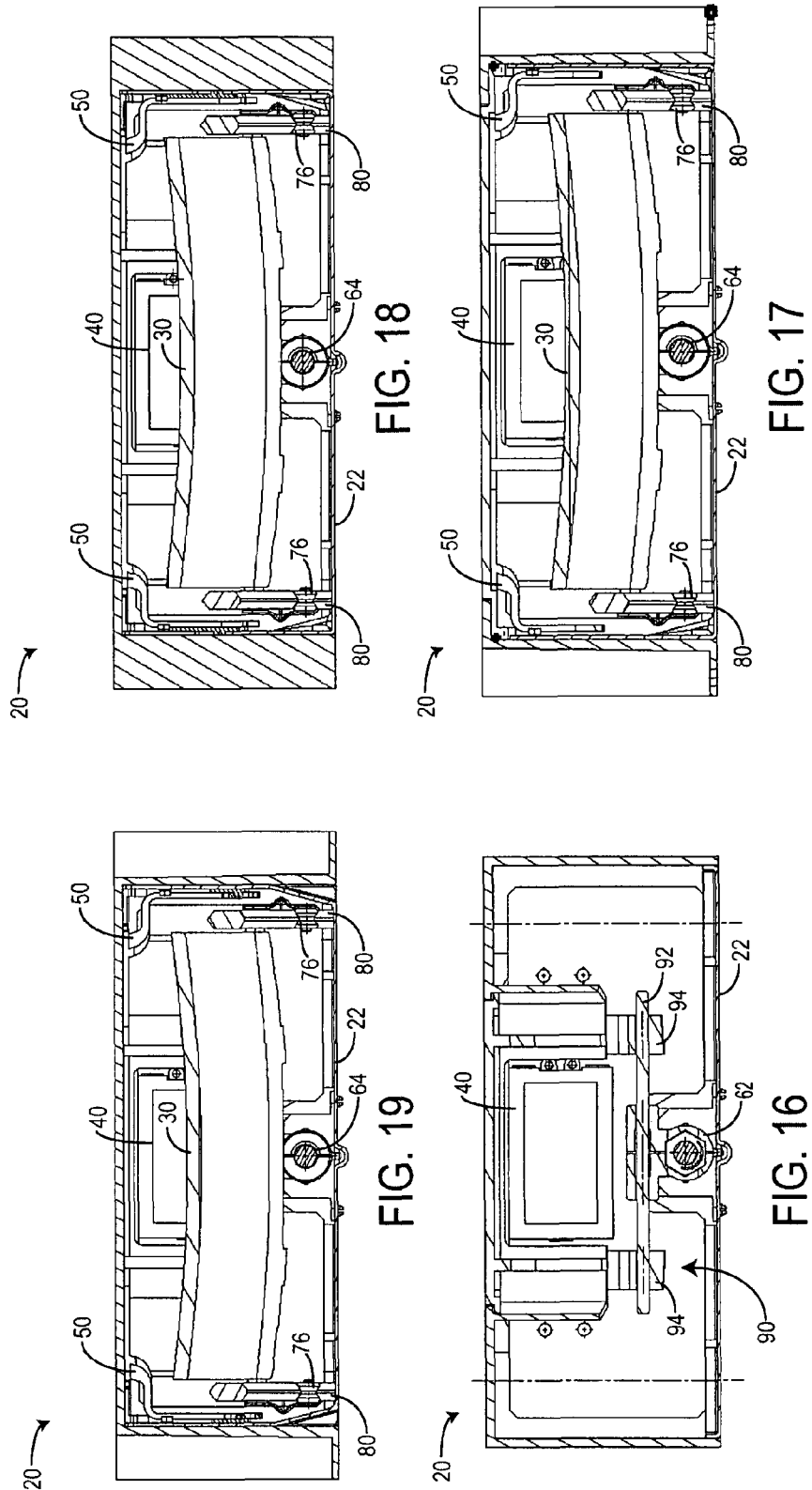

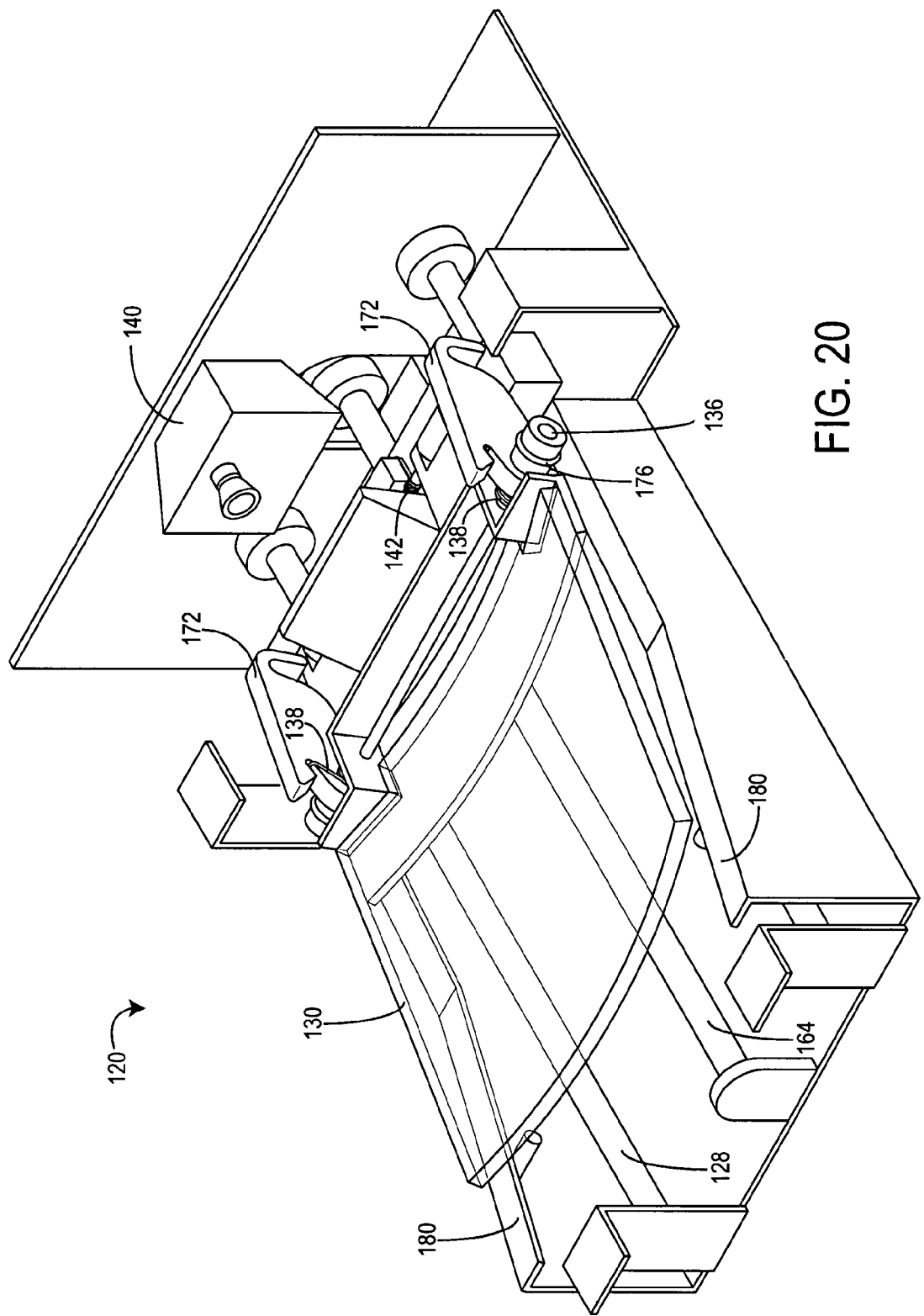

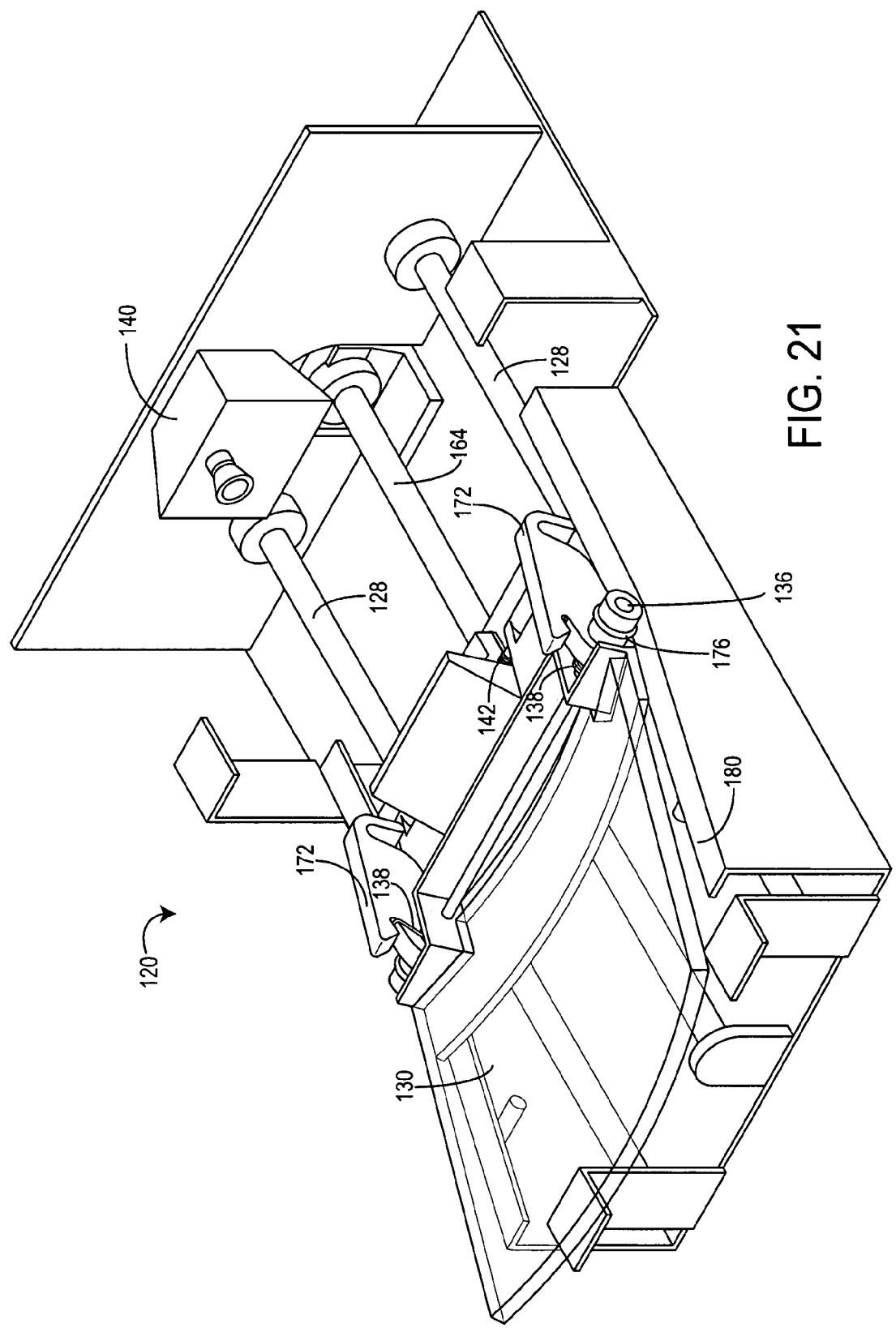

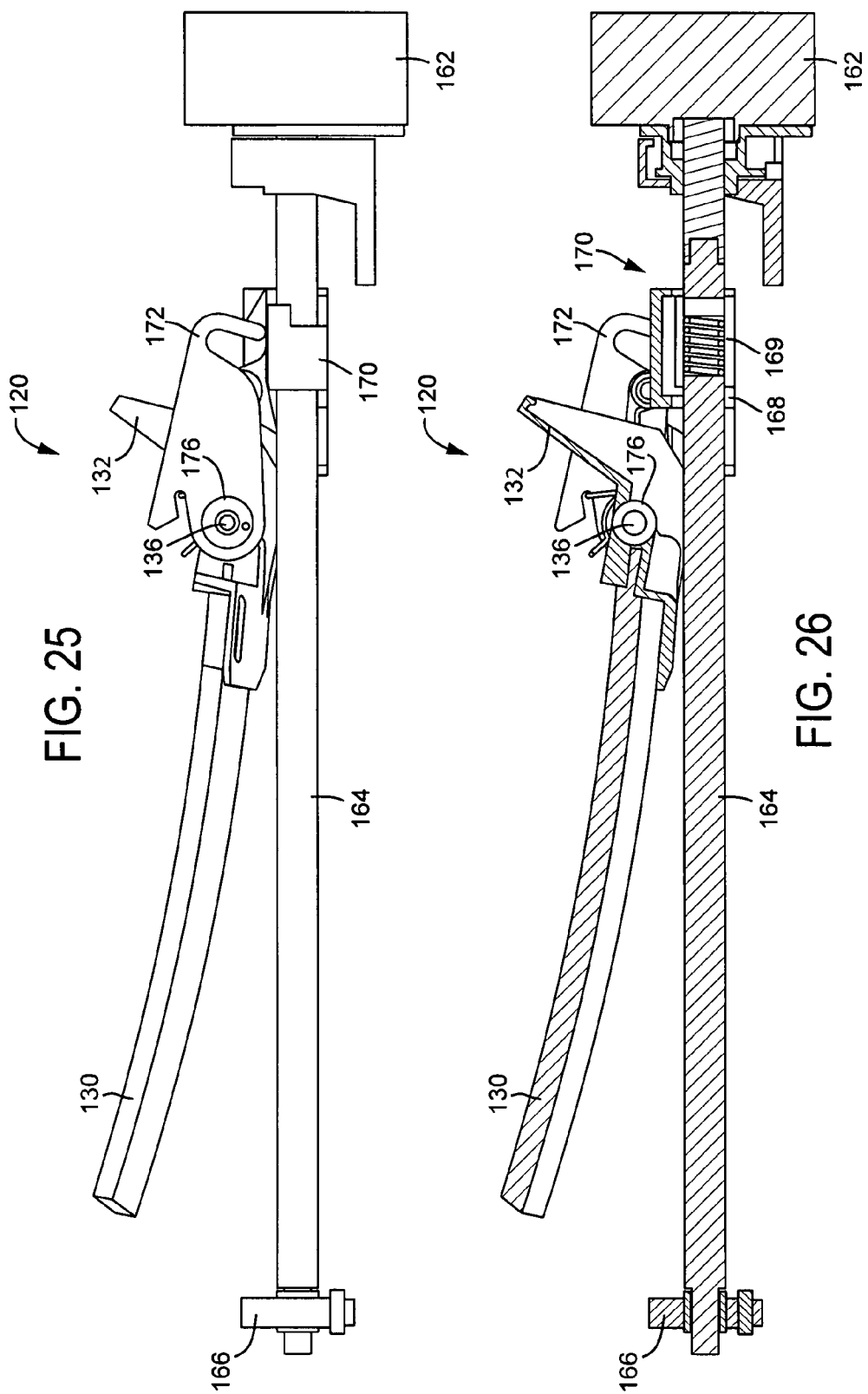

1

APPARATUS AND SYSTEM FOR PROVIDING A VIRTUAL DISPLAY FOR A VEHICLE

CROSS REFERENCE TO RELATED PATENT APPLICATIONS

The present application claims the benefit of International Application No. PCT/US2007/024239 filed Nov. 20, 2007, which claims the benefit of U.S. Provisional Patent Application No. 60/860,140 filed Nov. 20, 2006, the entire disclosures of which are incorporated by reference herein.

BACKGROUND

The present application relates generally to the field of display units for vehicles. Specifically, the application relates to a system for providing a virtual image, the virtual image displaying information such as but not limited to vehicle operating information (e.g., vehicle speed, engine speed, fuel levels and/or warnings).

Vehicles have utilized a display unit, sometimes called a head-up display unit (HUD), to provide a virtual image in a driver's field of vision. Displays generally include a projector that provides an image onto a semi-reflective surface. The semi-reflective surface can be a windshield or a semi-reflective member (e.g., mirror, glass, etc.) disposed in front of the windshield. The reflection of the image is seen by a driver and is perceived as existing at some point beyond the semi-reflective surface, generally outside the vehicle. Displays that provide a virtual image are desirable because information is at a focal length more consistent within the driver's field of vision and the driver does not have to look down to access the information as with a conventional instrument cluster.

It would be desirable to provide a display unit with a semi-reflective surface that is configured to be retracted and generally hidden within the dashboard when not in use. It would also be desirable for the display unit to be a simple and robust system that is driven by a single motor. It would also be desirable to provide a display unit that is less susceptible to vibration, temperature changes, and/or heat dissipation.

What is needed is a system and/or method that satisfies one or more of these needs or provides other advantageous features. Other features and advantages will be made apparent from the present specification. The teachings disclosed extend to those embodiments that fall within the scope of the claims, regardless of whether they accomplish one or more of the aforementioned needs.

SUMMARY

One embodiment relates to a display unit for mounting in a vehicle. The display unit includes an image generator. The display unit further includes a semi-reflective member. The semi-reflective member is configured to move from a non-operational position to an operation position. The semi-reflective member is positioned to reflect light from the image generator in an operational position.

Another embodiment relates to a method of using a virtual display. The virtual display includes a semi-reflective member and an image display. The method includes the step of moving the semi-reflective member from a non-operational position to an operational position. The method further includes the step of displaying a virtual image using the semi-reflective member and the image generator.

Another embodiment relates to a virtual image system for a vehicle. The virtual image system is configured to be disposed in or above a dashboard of a ground vehicle. The virtual image system includes a display and a semi-reflective member. The semi-reflective member is disposed in a non-operational position. The semi-reflective member is disposed upright with respect to a dashboard in an operational position.

Alternative exemplary embodiments relate to other features and combinations of features as may be generally recited in the claims.

BRIEF DESCRIPTION OF THE DRAWINGS

The application will become more fully understood from the following detailed description, taken in conjunction with the accompanying figures, wherein like reference numerals refer to like elements, in which:

FIG. 2 also shows an exemplary placement of a virtual image.

FIG. 6 is a perspective view drawing of a traveling portion of a drive system of the display unit in FIGS. 4A-4D, according to an exemplary embodiment.

FIG. 9 is a perspective view drawing of the display unit of FIG. 3D in an intermediate position, according to an exemplary embodiment.

FIG. 12 is a schematic side elevation view drawing of rollers for guiding movement of a screen of the display unit in FIGS. 3-5 according to an exemplary embodiment.

FIG. 16 is a schematic cross-sectional view drawing cut across section "16" of the display unit in FIG. 14 according to an exemplary embodiment.

FIG. 17 is a schematic cross-sectional view drawing cut across section "17" of the display unit in FIG. 14 according to an exemplary embodiment.

FIG. 18 is a schematic cross-sectional view drawing cut across section "18" of the display unit in FIG. 15 according to an exemplary embodiment.

FIG. 19 is a schematic cross-sectional view drawing cut across section "19" of the display unit in FIG. 14 according to an exemplary embodiment.

FIG. 20 is a perspective view a display unit in a closed position, according to an alternative exemplary embodiment.

FIG. 21 is a perspective view of the display unit of FIG. 20, in a first intermediate position, according to an exemplary embodiment.

FIG. 25 is a partial side elevation view of the display unit of FIG. 20, in a closed position, according to an exemplary embodiment.

FIG. 26 is a partial cutaway side elevation view of the display unit of FIG. 20, in a closed position, according to an exemplary embodiment.

DETAILED DESCRIPTION OF THE EXEMPLARY EMBODIMENTS

Before turning to the figures which illustrate the exemplary embodiments in detail, it should be understood that the application is not limited to the details or methodology set forth in the following description or illustrated in the figures. It should also be understood that the phraseology and terminology employed herein is for the purpose of description only and should not be regarded as limiting.

For purposes of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

Figure 1:
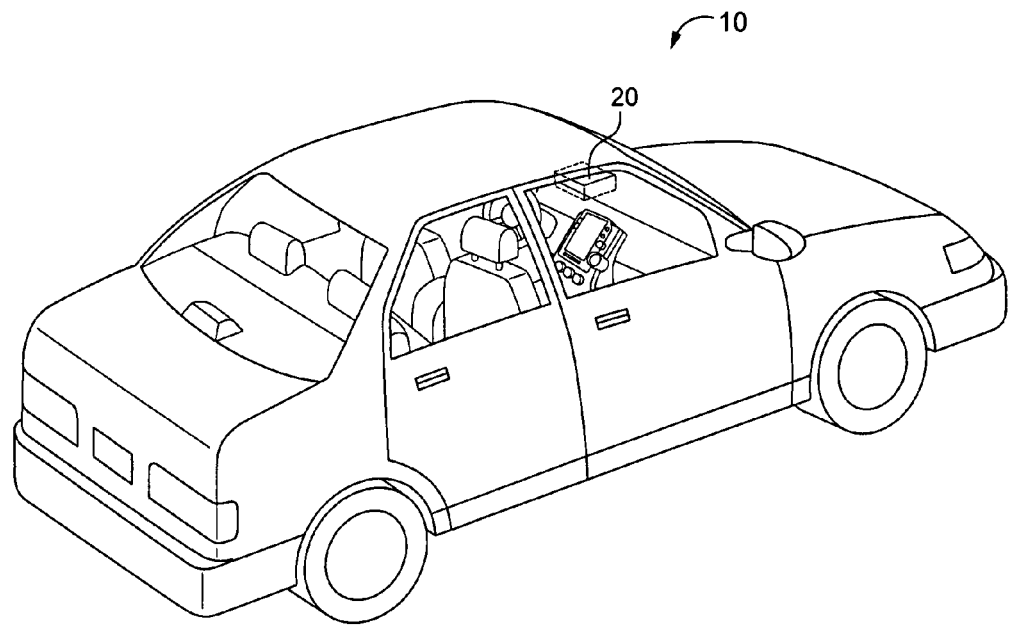
FIG. 1 is a schematic isometric view drawing of a vehicle with a display unit according to an exemplary embodiment.
Figure 2:
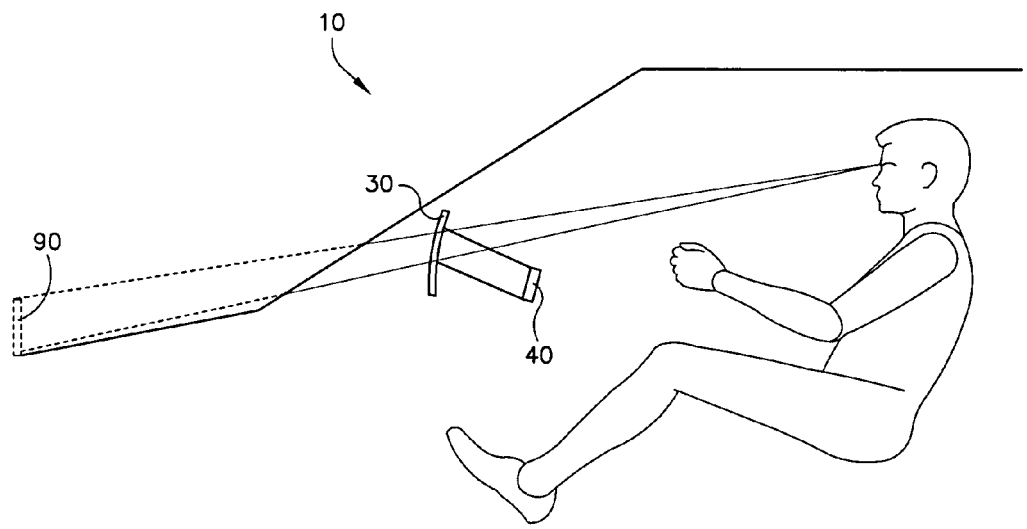
FIG. 2 is a schematic side elevation view drawing of a vehicle having a display unit according to an exemplary embodiment.

Referring to FIG. 1, a vehicle 10 is shown with a display unit 20 according to an exemplary embodiment. Referring to FIG. 2, the display unit 20 is mounted in the dashboard of the vehicle 10 generally in line with the driver and above the steering wheel. Display unit 20 (or portions thereof) can be situated on a top surface of the dashboard or below the top surface of the dashboard. In a preferred embodiment, display unit 20 is formed to a singe unitary piece of equipment, display unit 20 having a top surface flush with the surface of the dashboard when in a non-operational position and having a mirror extending above the dashboard in an operational position.

Display unit 20 includes a semi-reflective member (e.g., screen, mirror, combiner, glass piece, plastic piece, etc.) 30 and an image generator 40 (e.g., display, source, projector, etc.) that are selectively deployed or revealed when display unit 20 moves from a first or closed position to a second or operational position. Image generator 40 is generally a projector of any suitable past, present, or future technology capable of casting an image on semi-reflective member 30. Image generator 40 is generally configured to project an image onto one face of semi-reflective member 30. Generator 40 can use lenses to project the image or might operate without the use of lenses. Semi-reflective member 30 reflects and focuses the image generally at the eyes of the driver (e.g., at the head of the driver, above the vehicle's dash, above the steering wheel, at the headrests, at a passenger location, etc.) and creates a virtual display 90 at some point on the opposite side of the semi-reflective member from the driver. Virtual display 90 allows information (e.g., vehicle speed, engine RPM, fuel level, navigation information, point of interest information, map information, hands-free call information, music information, HVAC information, direction information, etc.) to be displayed in the driver's field of vision (e.g. out the windshield of the vehicle), allowing the driver to see the information without looking down at a conventional gauge cluster.

FIG. 2 shows one exemplary location of virtual display 90, generally along the hood of the vehicle and approximately 2 meters from the driver. According to other exemplary embodiments, display unit 20 may be used to display other information or images. For example, the display unit may display images from cameras or other sources (e.g., an image of the area behind the vehicle) or may display images that enhance the area seen by the driver out the windshield (e.g., a night vision overlay, a road line overlay, road sign enhancement, road detail enhancement, navigational aides, map information, point of interest information, etc.).

Referring to FIGS. 3A-3D and 4A-4D, when in a first or closed configuration, display unit 20 presents a generally continuous contour with (or within) the dashboard of vehicle 10. Display unit 20 includes a housing or casing 22, a first door or flap (e.g., horizontal door, top door, etc.) 42, and a second door or flap (e.g., vertical door, front door, etc.) 50. The casing includes features 24 (shown as outwardly extending protrusions) (e.g., brackets) that are configured to allow the display unit 20 to be coupled to the vehicle 10. When display unit 20 moves toward a second or operational position, the first door 42 pivots downward to reveal image generator 40 (shown in FIGS. 3B-3D and 4B-4D) and the second door 50 rotates upward to allow semi-reflective member 30 to deploy from inside housing 22 (shown in FIGS. 3B-3D). The semi-reflective member 30 is deployed out of the housing 22 and pivots to a generally vertical orientation in the operational position (shown in FIGS. 3D and 4D). Data cables from the vehicle (e.g., vehicle media system, vehicle control system, vehicle ECU, vehicle data bus, etc.) are coupled to the back of the display unit to transfer vehicle information to the display unit (and the image generator in particular).

According to an exemplary embodiment, semi-reflective member 30 is a semi-reflective material (or has been treated or formed so that it is semi-reflective). Semi-reflective member 30 might be a one piece member, or might be made of multiple layers, pieces, or sections. Semi-reflective member 30 is shown as having a generally parabolic body. Semi-reflective member 30 may be shaped and/or have material properties such that it is configured to reflect an image while still maintaining at least partial transparency. A parabolic shape of semi-reflective member 30 may be configured to focus the image projected from image generator 40 (and reflected back at the eyes of the driver). According to various other exemplary embodiments, semi-reflective member 30 may be of any shape, size, or material or materials suitable for reflecting an image from image generator 40.

Figure 3A:
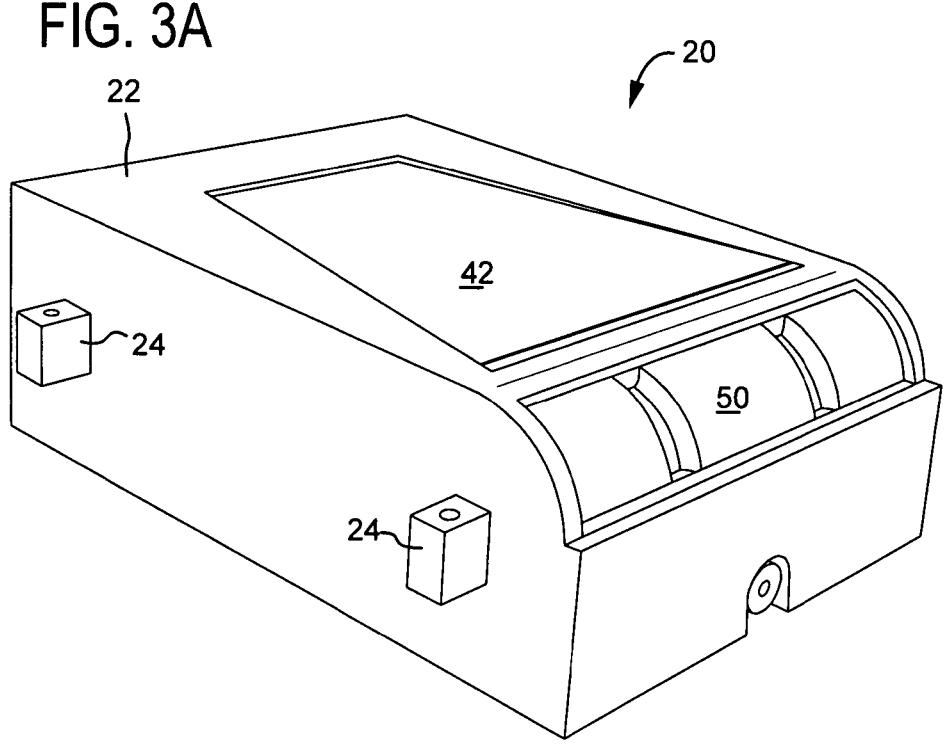
FIGS. 3A-3D are schematic isometric view drawings of a display unit in closed, intermediate, and operational positions according to an exemplary embodiment.
Figure 3B:
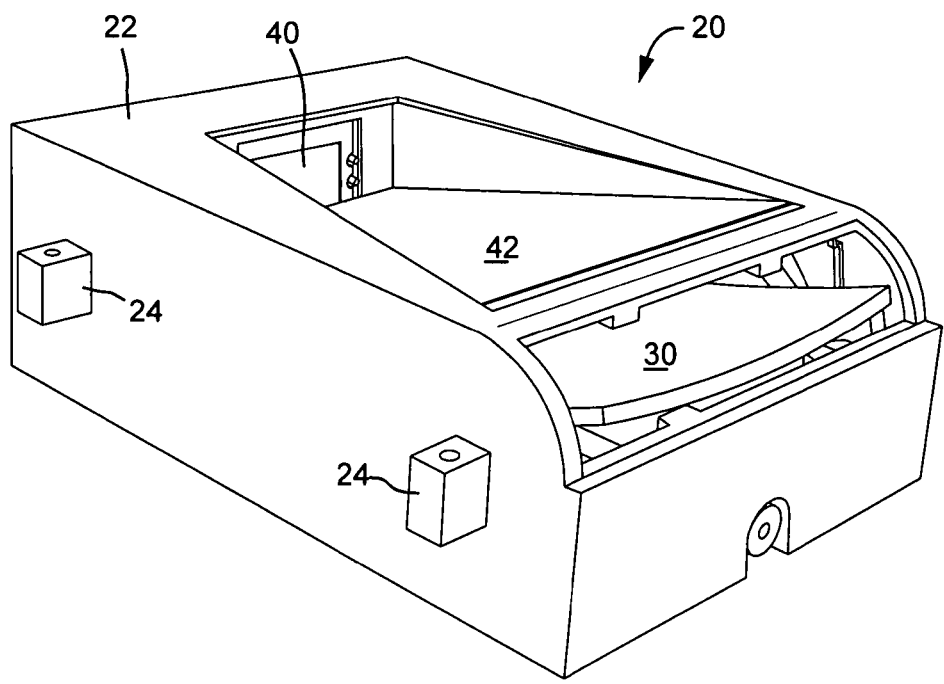
Figure 3C:
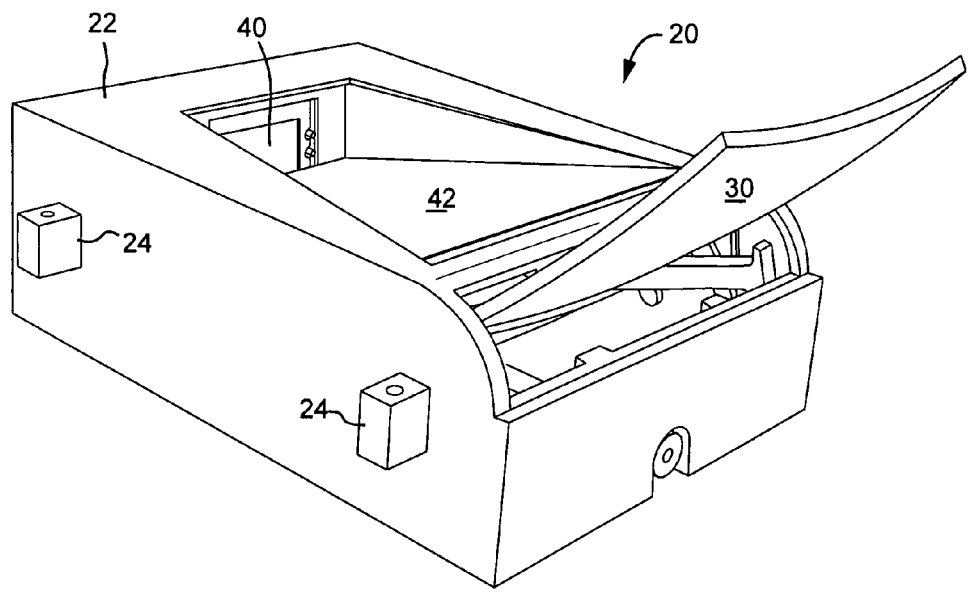
Figure 3D:
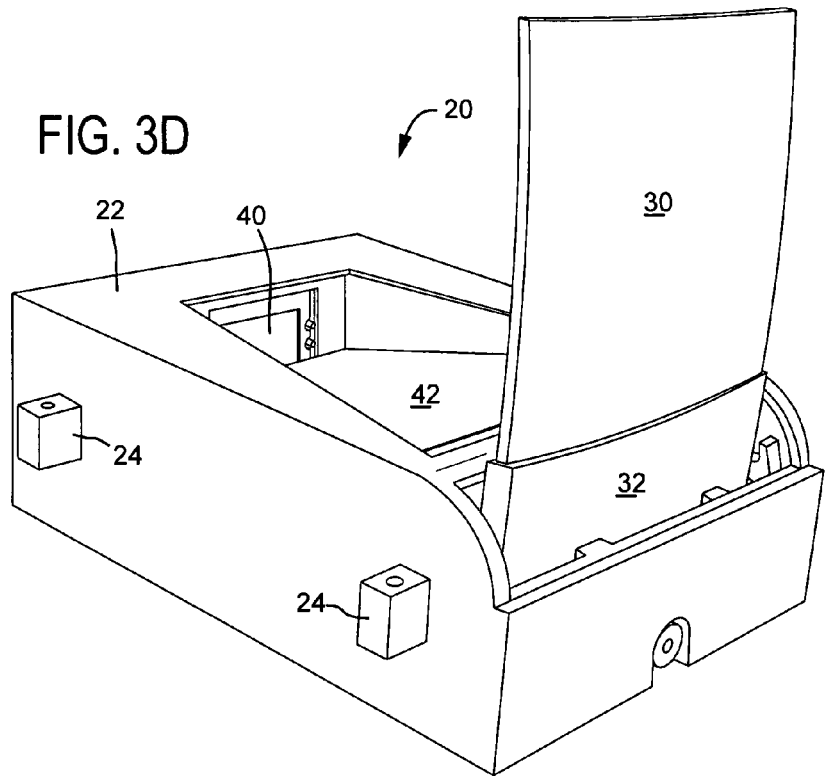
Figure 4A:
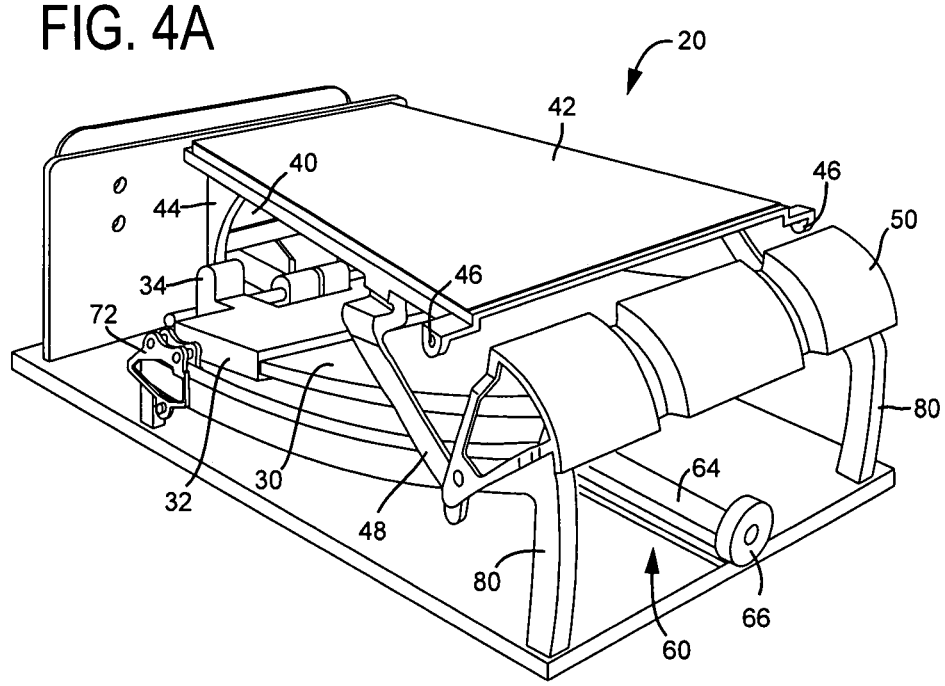
FIGS. 4A-4D are schematic isometric view drawings of the display unit in the positions of FIGS. 3A-3D, further showing the display unit 20 with a portion of the housing removed.
Figure 4B:
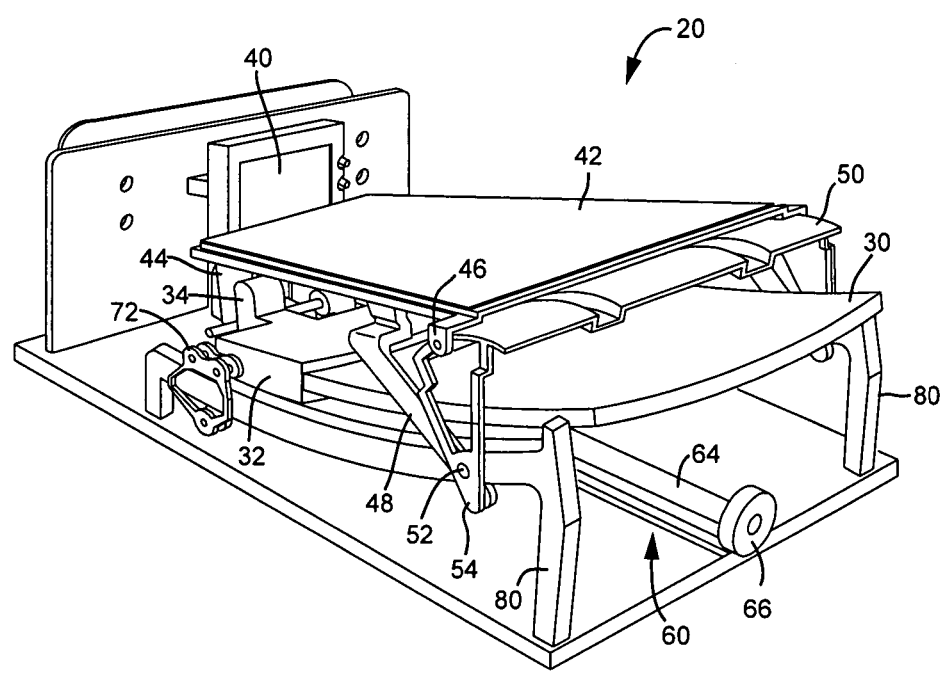
Figure 4C:
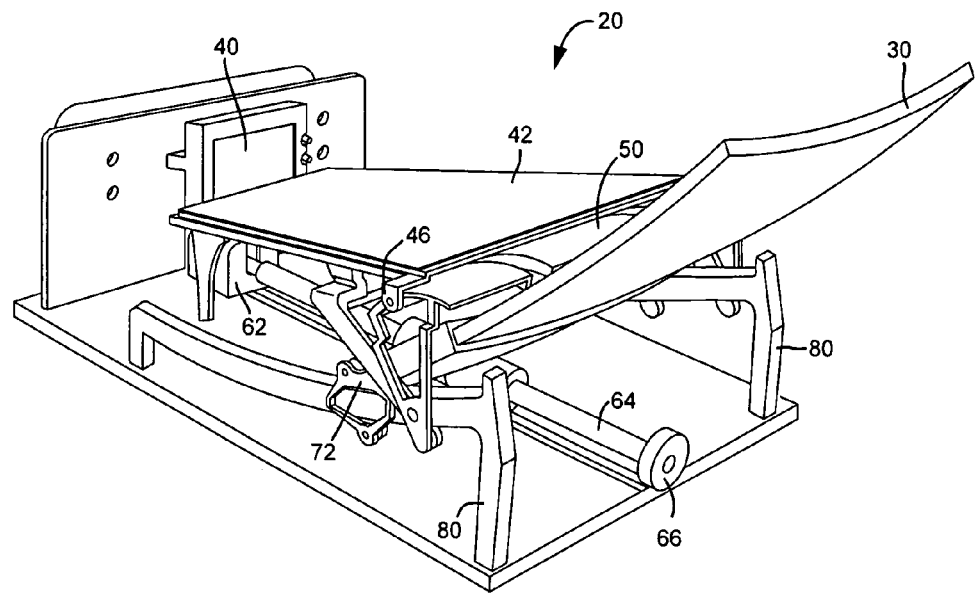
Figure 4D:
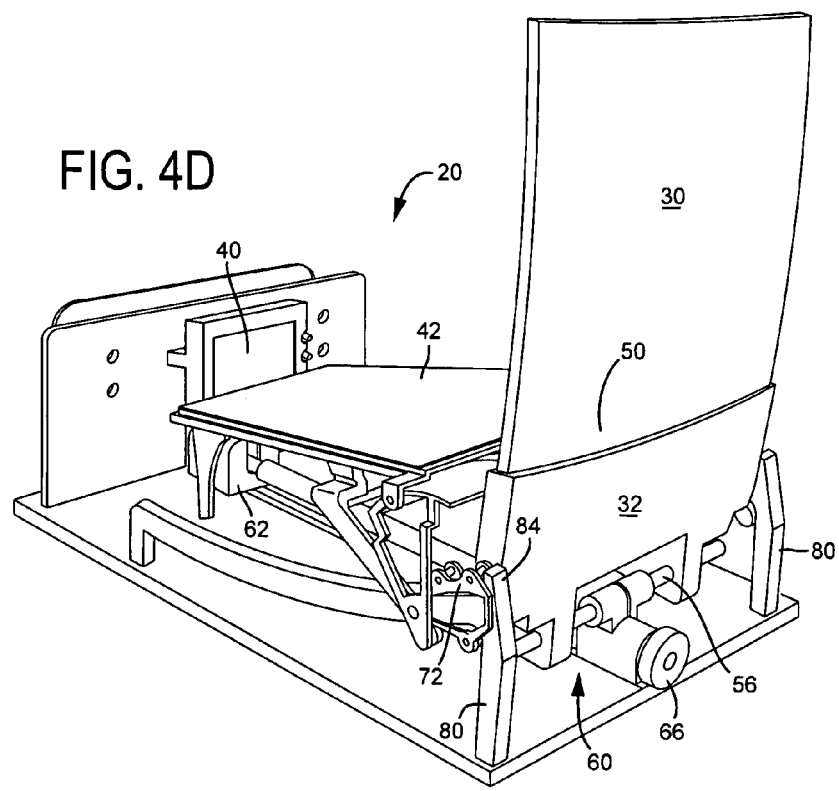
Figure 5A:
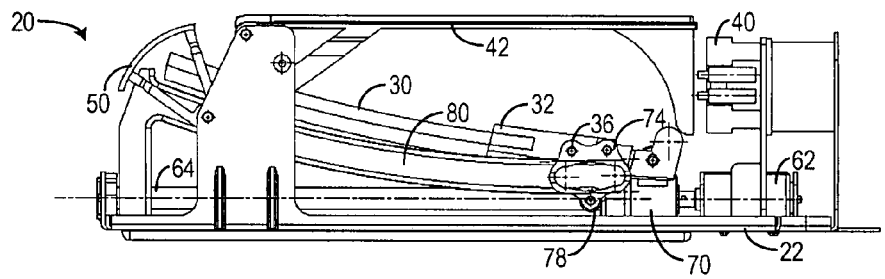
FIGS. 5A-5D are side elevation view drawings of the display unit in the closed, intermediate, and operational positions of FIGS. 4A-4D according to an exemplary embodiment.
Figure 5B:
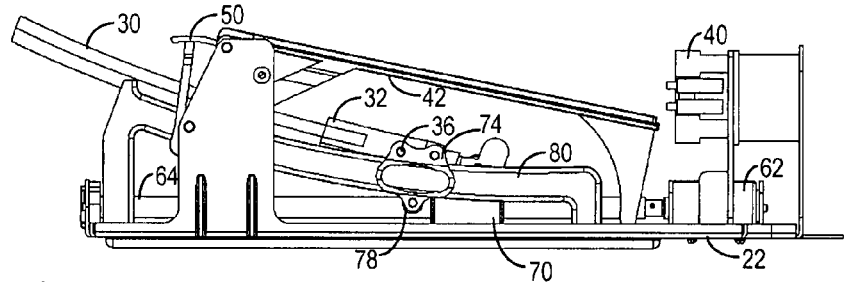
Figure 5C:
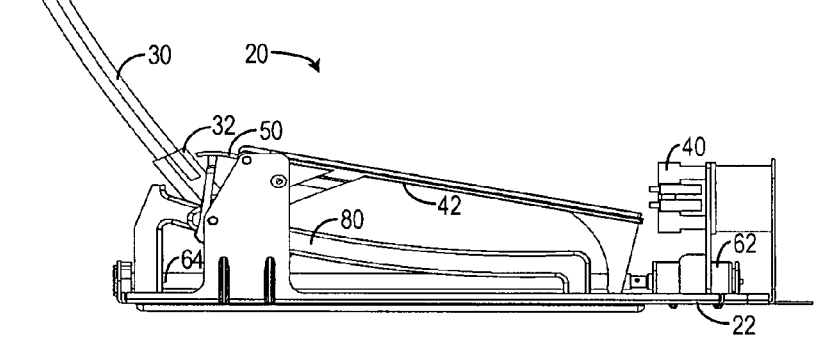
Figure 5D:
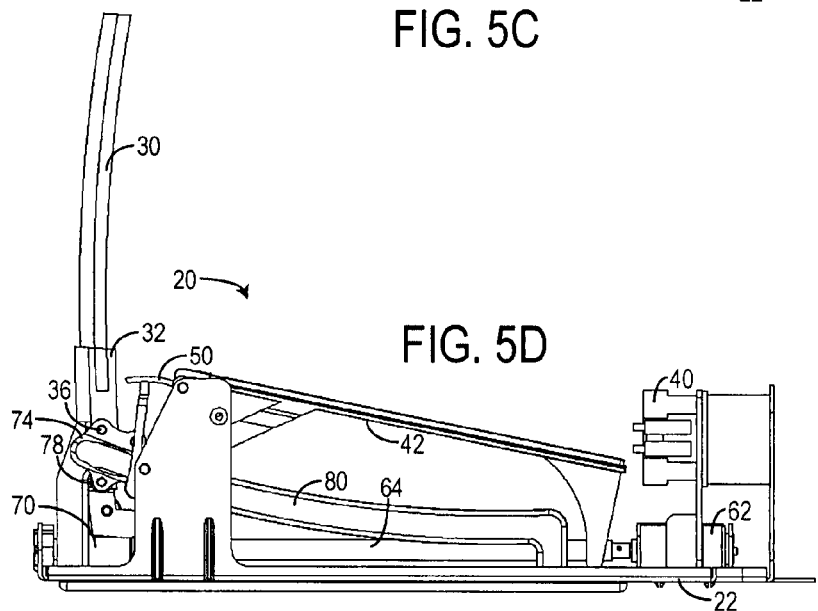

Referring to FIGS. 3A-D, 4A-D, and 5A-D, display unit 20 is shown in various positions. FIGS. 3A-D show display unit 20 with the housing. 22 in place and FIGS. 4A-5D show the display unit 20 with a portion of the housing 22 removed. FIGS. 3A, 4A and 5A show the display unit 20 in a closed configuration where semi-reflective member 30 is enclosed within housing 22 and/or wherein semi-reflective member is folded down. FIGS. 3B, 4B, and 5B show display unit 20 with the first door 42 and the second door 50 in an operational position or rotated up and/or out of the way so that semi-reflective member 30 may pass through the opening created. FIGS. 3C, 4C, and 5C show the display unit in an intermediate position with semi-reflective member 30 partially emerged from housing 22. FIGS. 3D, 4D, and 5D show the display unit 20 in an operational position where semi-reflective member 30 is fully emerged from housing 22 to a position where image generator 40 can display an image on semi-reflective member 30.

Referring especially to FIGS. 4A-4D and 5A-5D, image generator 40 is shown in greater detail. According to an exemplary embodiment, image generator 40 is a backlit liquid crystal display, but could be of any suitable past, present or future technology (e.g., DLP, OLED, plasma, LED, etc.). The backlighting may be provided by a plurality of light emitting diodes such as super bright white LEDS producing illumination of approximately 6000 candelas/m$^2$. According to other exemplary embodiments the backlighting could be provided by another lighting technology of the past, present, or future (e.g., a cathode ray tube, organic LEDs, florescent lamp etc.).

Referring generally to FIGS. 3D-19, semi-reflective member 30 is coupled to a holder 32 (e.g., blade, base, etc.). Holder 32 is pivotably coupled to a drive system 60 (shown in FIG. 4D) with a shaft or axle 56 and pivotably coupled to one or more trolleys 72 (shown in detail in FIG. 12), each trolley including a frame or body 74 and at least one roller 76, 78 which ride along rails 80 provided on either side of the semi-reflective member 30. According to an exemplary embodiment, rails 80 are metal members and are configured to help stabilize holder 32 and semi-reflective member 30 as they move from a closed position (i.e., non-operational position) to an operational position and during use when semi-reflective member 30 is in the operational position.

FIGS. 3A, 4A, and 5A more specifically shows display unit 20 in a closed configuration in which semi-reflective member 30 is retracted within housing 22 and first 42 and second 50 doors are closed to provide a generally smooth continuous contour with the housing 22. First door 42 is pivotably coupled to housing 22 at pivot points 46 disposed away from the projector 40. First door 42 is held in the closed position by a protrusion 34 extending outward from holder 32 which contacts a flange 44 extending outward from first door 42. On either side, second door 50 is coupled to arm or link 48 extending from first door 42 at pivot point 54 and to rails 80 at pivot point 52. The relative movement of pivot point 52 relative to pivot points 54 rotates second door 50 around pivot points 54. When first door 42 is in a closed position, the second door 50 is in a closed position and when the first door 42 is in an operational position, second door 50 is in an operational position.

Figure 7:
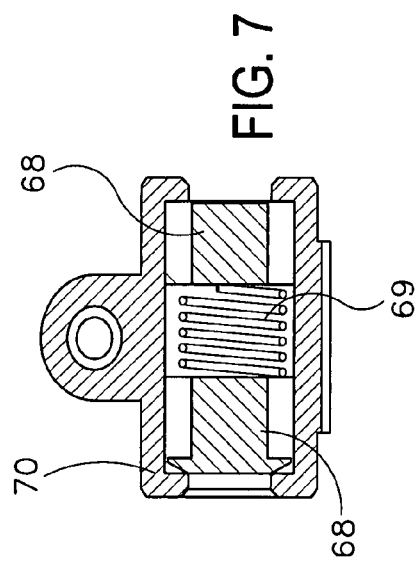
FIG. 7 is a schematic sectional view drawing of the portion of the drive assembly shown in FIG. 6, according to an exemplary embodiment.
Figure 8:
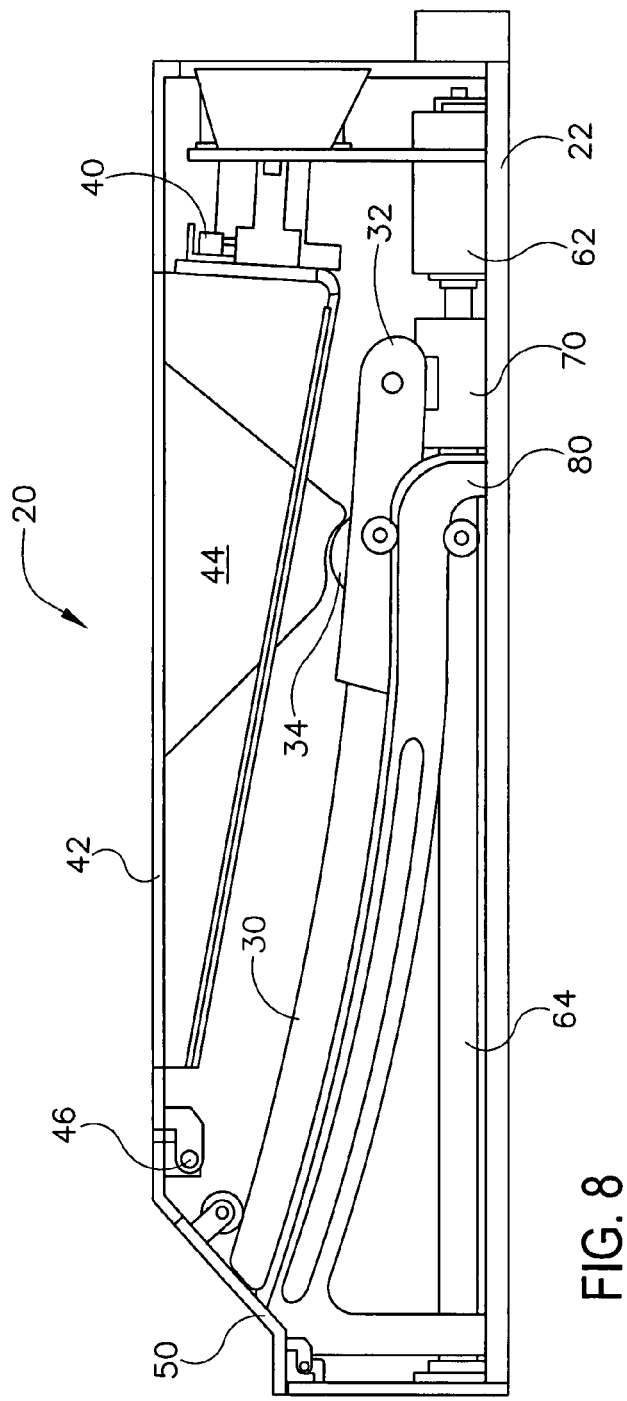
FIG. 8 is a side elevation view drawing of the display unit of FIGS. 3A-3D in a closed position, according to an exemplary embodiment.
Figure 10:
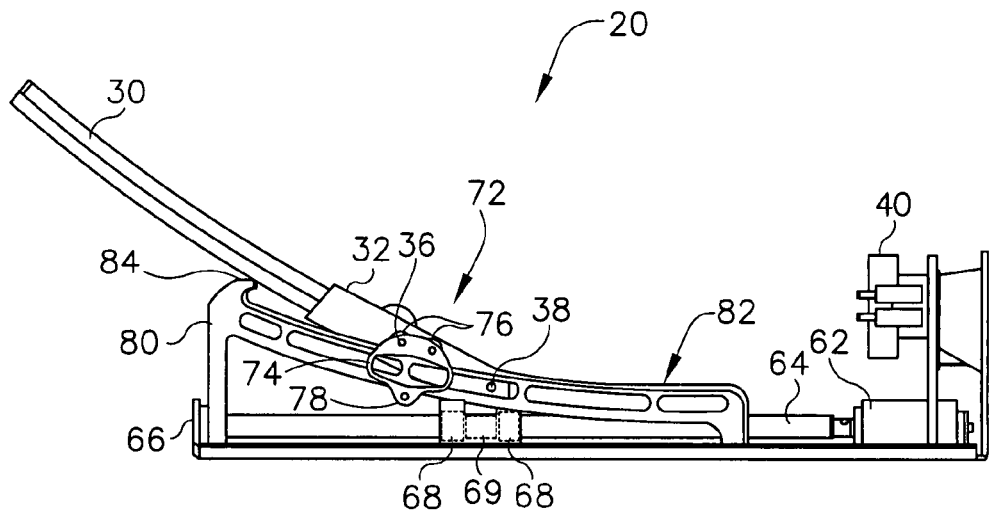
FIG. 10 is a schematic side elevation view drawing of the display unit of FIG. 8, in an intermediate position, according to an exemplary embodiment.
Figure 11:
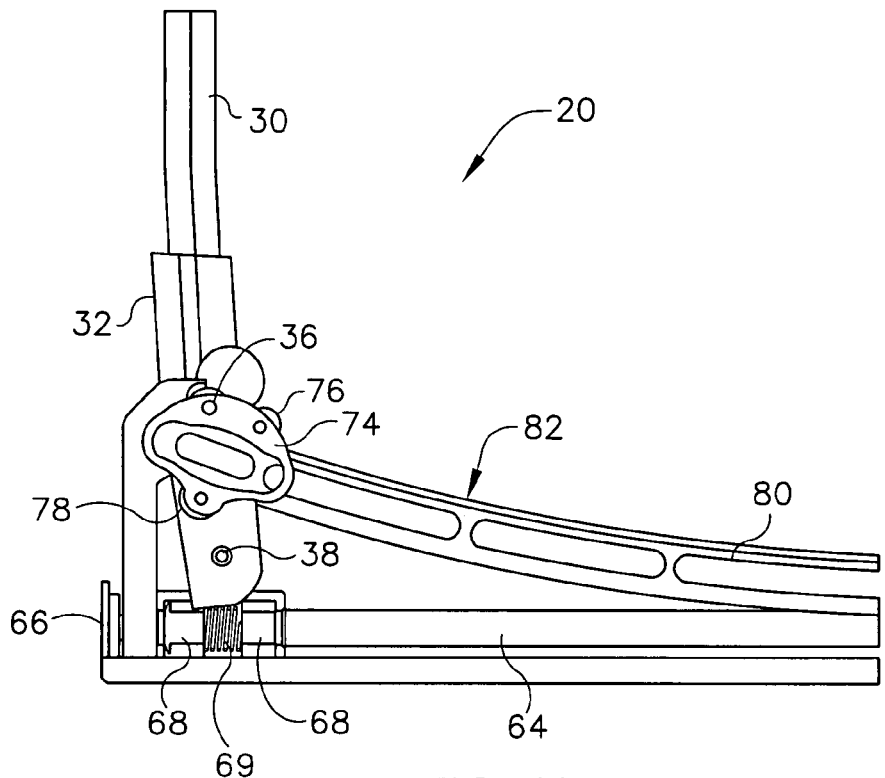
FIG. 11 is a schematic side elevation view drawing of the display unit in FIG. 3D in an operational position, according to an exemplary embodiment.

Drive system 60, shown in FIGS. 6 and 7 in detail, is configured to facilitate travel of semi-reflective member 30 between a closed position (non-operational position) and a deployed position (operational position). Drive system 60 includes a motor 62, a threaded rod (e.g., lead screw, bolt) 64, two threaded members (e.g., nuts, thread receiving devices) 68, a spring 69 retained by a housing 70, and a bearing 66. According to an exemplary embodiment, motor 62 is mounted to housing 22 and turns threaded rod 64. According to an exemplary embodiment, motor 62 is a DC motor. According to other exemplary embodiments motor 62 may be a stepper motor or any other suitable source for providing motive force to the system. According to an exemplary embodiment, motor 62 is stationary, and the stationary placement or nature of motor 62 prevents the need for trailing wires or cables that would be needed to provide power to a motor that moved with holder 32 and semi-reflective member 30. Threaded rod 64 is coupled on one end to motor 62 and on another end to a bearing 66. According to an exemplary embodiment, motor 62 is disposed on the same end of display unit 20 as image generator 40. According to various other exemplary embodiments, the motor is disposed on the opposite end of the display unit. Threaded members 68 are threadably engaged with threaded rod 64. According to an exemplary embodiment, threaded members 68 are at least partially surrounded by housing 70.

According to an exemplary embodiment, threaded rod 64 passes through a spring 69 provided between threaded members 68. Spring 69 is configured to provide a biasing force to threaded members 68 to ensure that at least one of threaded members 68 remains in contact with threaded rod 64, or, for example, to adjust the gap between one of threaded members 68 if threaded rod 64 begins rotation in a direction opposite of its recent movement. Housing 70 is coupled to holder 32 (via rod 56 or otherwise) and may also prevent threaded members 68 from turning with threaded rod 64. As motor 62 turns threaded rod 64, threaded members 68 and housing 70 travel longitudinally along threaded rod 64.

FIGS. 4A-4D and 5A-5D more specifically show display unit 20 (and the semi-reflective member) moving from a closed or non-operational position to an operational position. Motor 62 turns threaded rod 64, causing holder 32 and semi-reflective member 30 to translate longitudinally along threaded rod 64 via drive system 60. As holder 32 is moved away from a closed position, protrusion 34 and flange 44 on first door 42 are disengaged, allowing first door 42 to pivot downward from a non-operational position to an operational position, exposing image generator 40. Flange 44 and protrusion 34 each included ramped surfaces to allow for a smooth and gradual transition. According to an exemplary embodiment, first door 42 is biased towards the operational position (or, in other exemplary embodiments, towards the non-operational position) with a biasing member. The biasing member can be a spring, elastic element, or other means for providing a force. According to other exemplary embodiments, a biasing member may not be used and first door 42 may rely on gravity to move it from a closed position to a operational position. As first door 42 pivots downward, arms 48 cause second door 50 to rotate upward, creating an opening in the housing 22 for the semi-reflective member 30 to extend through.

As shown in FIGS. 3B, 4B, and 5B, when protrusion 34 on holder 32, and flange 44 on first door 42, are completely disengaged, first door 42 and second door 50 are in the operational position and the semi-reflective member 30 is still within the housing 22.

Referring to FIGS. 4C and 5C, semi-reflective member 30 is shown translated along threaded rod 64 by housing 70 and threaded members 68 in a position intermediate between the non-operational position (e.g., closed position, folded down position, etc.) and the operational position (e.g., open position). Each of trolleys 72 have rollers 76 that ride in a groove 82 (shown in FIG. 12 as a generally v-shaped groove) on the upper surface of a rail 80 and a third roller 78 that rides along the bottom surface of the rail 80. Groove 82 substantially prevents trolley 72 from moving laterally relative to rail 80 while third roller 78 prevents trolley 72 from lifting off rail 80. Groove 82 and third roller 78 urge trolley 72 to be in contact with rail 80 through the entire range of motion of display unit 20. Rail 80 has a contour or profile such that rail 80 is closer to threaded rod 64 on the end proximate to image generator 40 and further away (vertically) from threaded rod 64 on the end opposite of image generator 40 (the end near bearing 66). Because of this, pivot points 36 at which holder 32 is coupled to trolley 72 rise relative to pivot points 38 at which holder 32 is coupled to housing 70 with shaft 56, causing holder 32 and semi-reflective member 30 to rotate upward as they move away from image generator 40 and out of housing 22.

Referring to FIGS. 3D, 4D, and 5D, display unit 20 is shown in the operational position with semi-reflective member 30 also in an operational position (e.g., a position whereby semi-reflective member 30 is generally perpendicular to its orientation when display unit 20 is in the non-operational position). One or more rails 80 further include a protrusion (or protrusions) 84 that acts as a mechanical stop for trolleys 72 at the operational position. According to an exemplary embodiment, semi-reflective member 30 faces image generator 40 when in an operational position.

When display unit 20 is opening or moving to an operational position, motor 62 is rotating threaded rod 64 in a first direction. When display unit 20 is returning to a closed configuration (e.g., semi-reflective member 30 returns to a non-operational position), motor 62 rotates in the opposite direction, turning threaded rod 64 in the opposite direction and causes housing 70 to move toward image generator 40. This movement retracts semi-reflective member 30 and holder 32 back into housing 22. When holder 32 is retracted to the position (e.g., the non-operational position) shown in FIGS. 4A and 5A, protrusion 34 contacts flange 44 extending from first door 42 and pushes first door 42 upward, concealing image generator 40. The movement of first door 42 further rotates second door 50 back into a closed position.

While display unit 20 is shown having an image generator 40 that projects an image directly onto semi-reflective member 30, it should be understood that many other variations are possible. For instance, according to other exemplary embodiments, image generator 40 may be oriented differently relative to semi-reflective member 30 and the image may be reflected off one or more intermediate mirrors between image generator 40 and semi-reflective member 30. According to other exemplary embodiments, the image may be magnified, shrunk, transformed, or otherwise distorted by intermediate lenses or mirrors between image generator 40 and semi-reflective member 30.

Referring to FIGS. 7-11, greater detail of rollers 76 and 78 of trolleys 72 and their interaction with rails 80 of display unit 20 is shown. As housing 70 travels along threaded rod 64, holder 32 pivots about housing 70 by way of pivot 38 and also pivots about trolley 72 with pivot 36. Trolley body 74 travels along rail 80 on each side of semi-reflective member 30 via rollers 76 and 78 positioned above and below rail 80, respectively. Holder 32 and semi-reflective member 30 both move laterally in the same direction as housing 70 while rotating about an axis perpendicular to housing 70, thus deploying semi-reflective member 30 from a closed position to an operational position at which point projector 40 may project an image onto semi-reflective member 30. Similarly, when housing travels back towards motor 62, holder 32 and semi-reflective member 30 move laterally with housing 70 while rotating about trolley 72 as rollers 76 and 78 travel along rail 80, thus storing semi-reflective member 30 in a closed position from an operational position.

Figure 13:
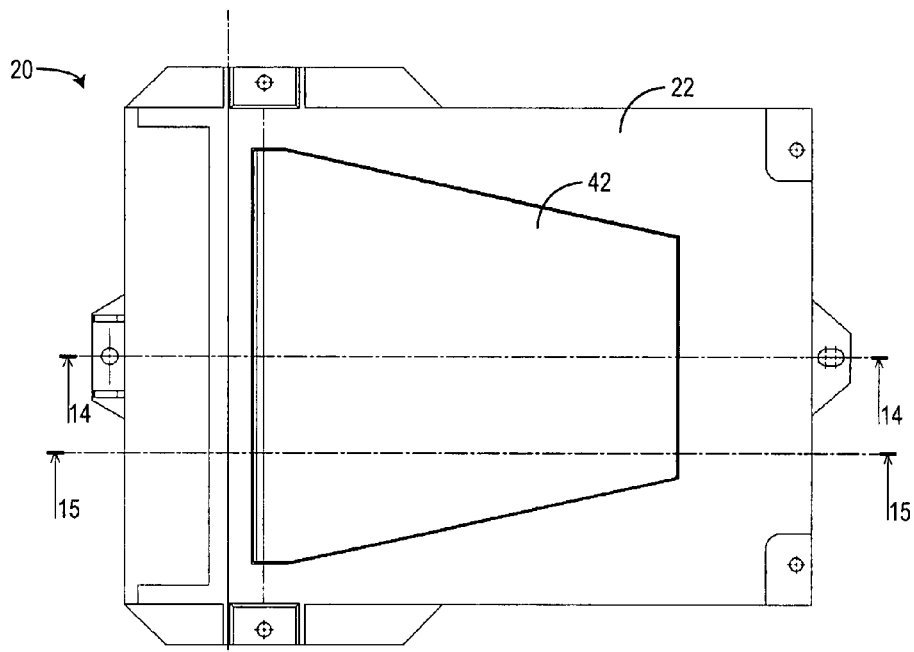
FIG. 13 is a top view drawing of the display unit in FIG. 3A, according to an exemplary embodiment.
Figure 14:
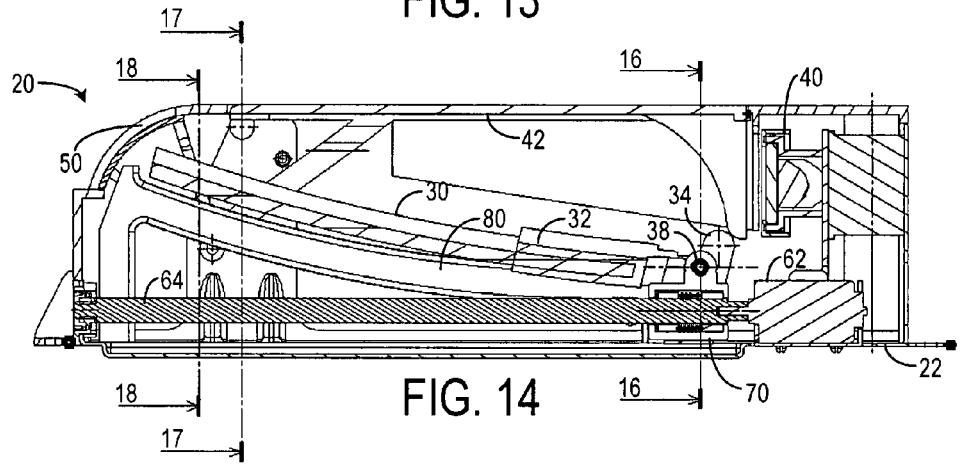
FIG. 14 is a cross-sectional view drawing cut across section "14" of the display unit in FIG. 13, according to an exemplary embodiment.
Figure 15:
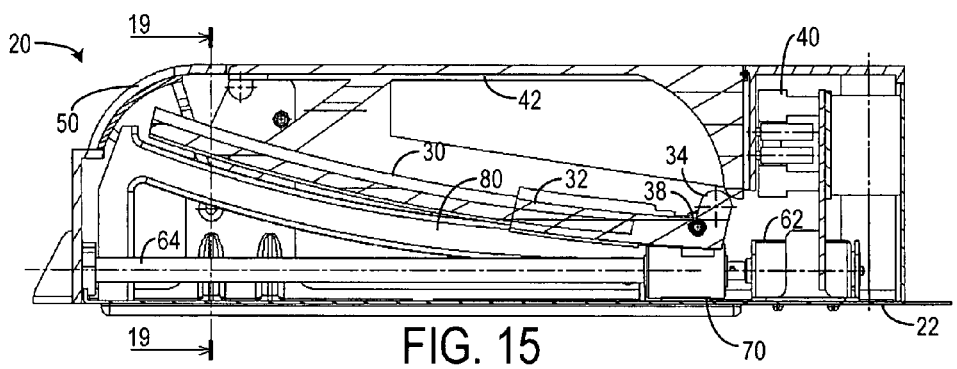
FIG. 15 is a schematic cross-sectional view drawing cut across section "15" of the display unit in FIG. 13, according to an exemplary embodiment.

Referring to FIG. 13, on overhead view of display unit 20 illustrates exemplary points at which housing 22 of display unit 20 may be fixed to vehicle 10, for example with screws, rivets, pins, stand-offs, nails, welding, an adhesive, or any other fastener or fastening technique. The figure also illustrates lines along which the cross-sectional views of FIGS. 14 and 15 are taken. Housing 22 and/or door 42 may be shaped or sized differently, according to other various embodiments.

Referring to FIGS. 14 and 15, further exemplary features are shown of the embodiments of display unit 20 illustrated in FIGS. 3-12. FIGS. 14 and 15 also illustrate the lines along which the cross-sectional views of FIGS. 16-19 are taken.

Referring to FIGS. 16-19, further exemplary characterizations are shown of the embodiments of display unit 20 illustrated in FIGS. 3-12. FIGS. 16-19 more specifically illustrate the relationship and proportions of a stored semi-reflective member 30 (when display unit 20 is in a closed position) as it relates to projector 40 according to at least one exemplary embodiment. Further, a mounting apparatus 90 configured to support the weight of and secure projector 40 to housing 22 while shielding projector 40 from motor 62. In this exemplary embodiment, apparatus 90 includes a plate 92 coupled to two shafts 94 that are fastened to projector 40.

Referring to FIGS. 20-23, perspective views of display unit 120 are shown, according to an alternative embodiment. Also referring to FIGS. 24-28, partial side elevation views of display unit 120 are shown. Housing 122 at least partially surrounds semi-reflective member 130 in a non-operational (e.g., closed) position. According to yet other embodiments, housing 122 is not integrally provided or directly coupled to display unit 120, but rather is provided by structures of the vehicle (e.g., vehicle dashboard or another vehicle part).

Display unit 120 is shown to include brackets 124 extending from frame 126. Frame 126 may generally extend the length of display unit 120, provide structural rigidity, and/or provide a base for mounting to other components of display unit 120. Brackets 124 may be generally configured to couple to a structure of the vehicle. In embodiments where housing is not integral with the display unit, frame 126 may couple to a vehicle provided housing structure via bracket 124.

Image generator 140 is shown coupled to display unit 120. Image generator 140 is generally configured to project images from near one distal end of display unit 120 to another distal end of display unit 120. As shown, image generator 140 is raised off frame 126. Image generator 140 may be held perpendicular to the length of frame 126, or may be held at some angle by one or more coupling elements provided between frame 126 and image generator 140. Image generator 140 may be coupled to a circuit board 141 (e.g., PCB, etc.).

Carriage 170 may generally be defined by or as the structure or structures that couple semi-reflective member 130 to threaded rod 164 for movement. Carriage 170 is shown to include a holder 132, a threaded member 168, a housing, a biasing member, a pivot 136, a roller 176, and a stabilizing member 172.

Figure 22:
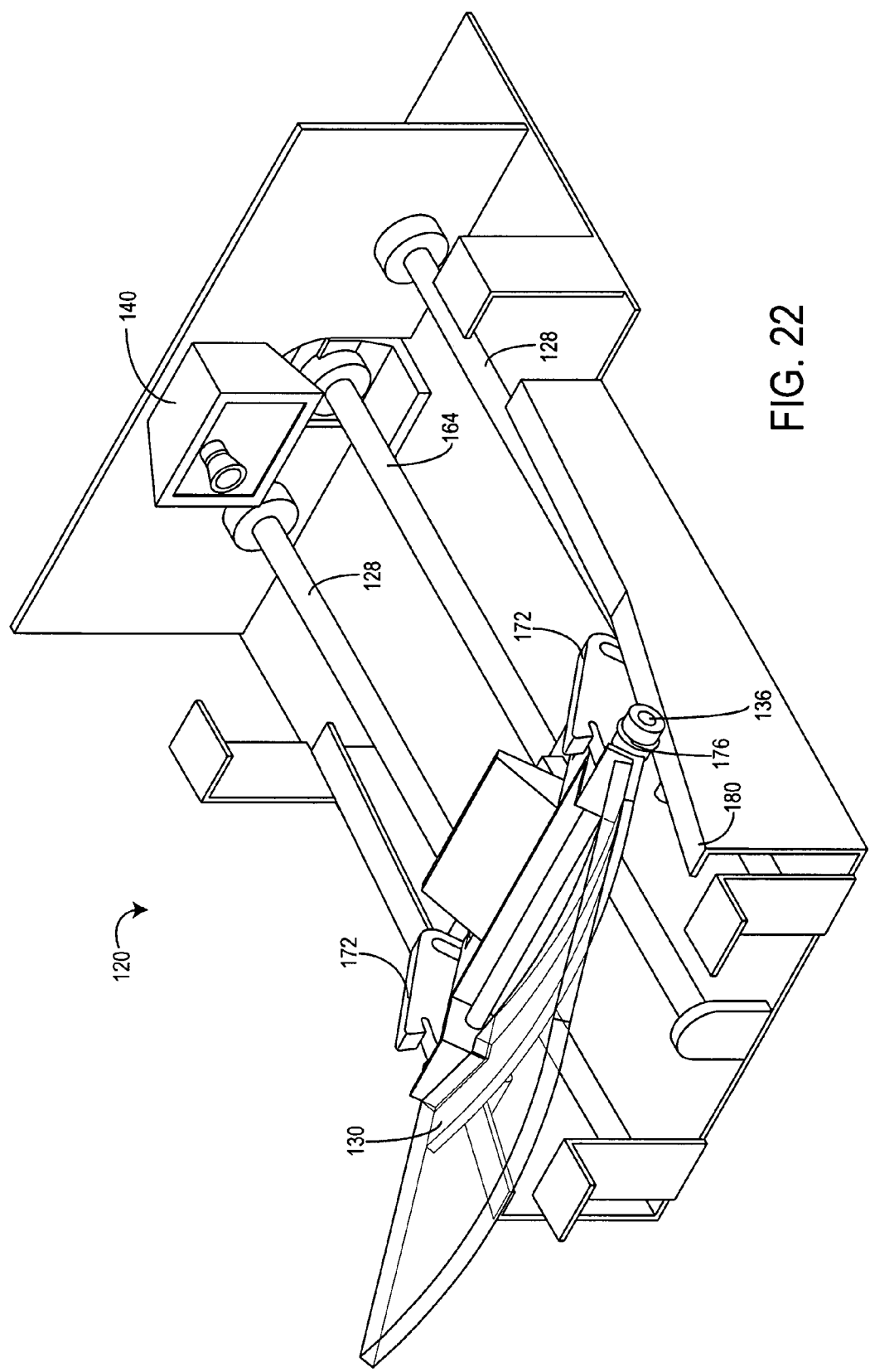
FIG. 22 is a perspective view of the display unit of FIG. 20, in a second intermediate position, according to an exemplary embodiment.
Figure 23:
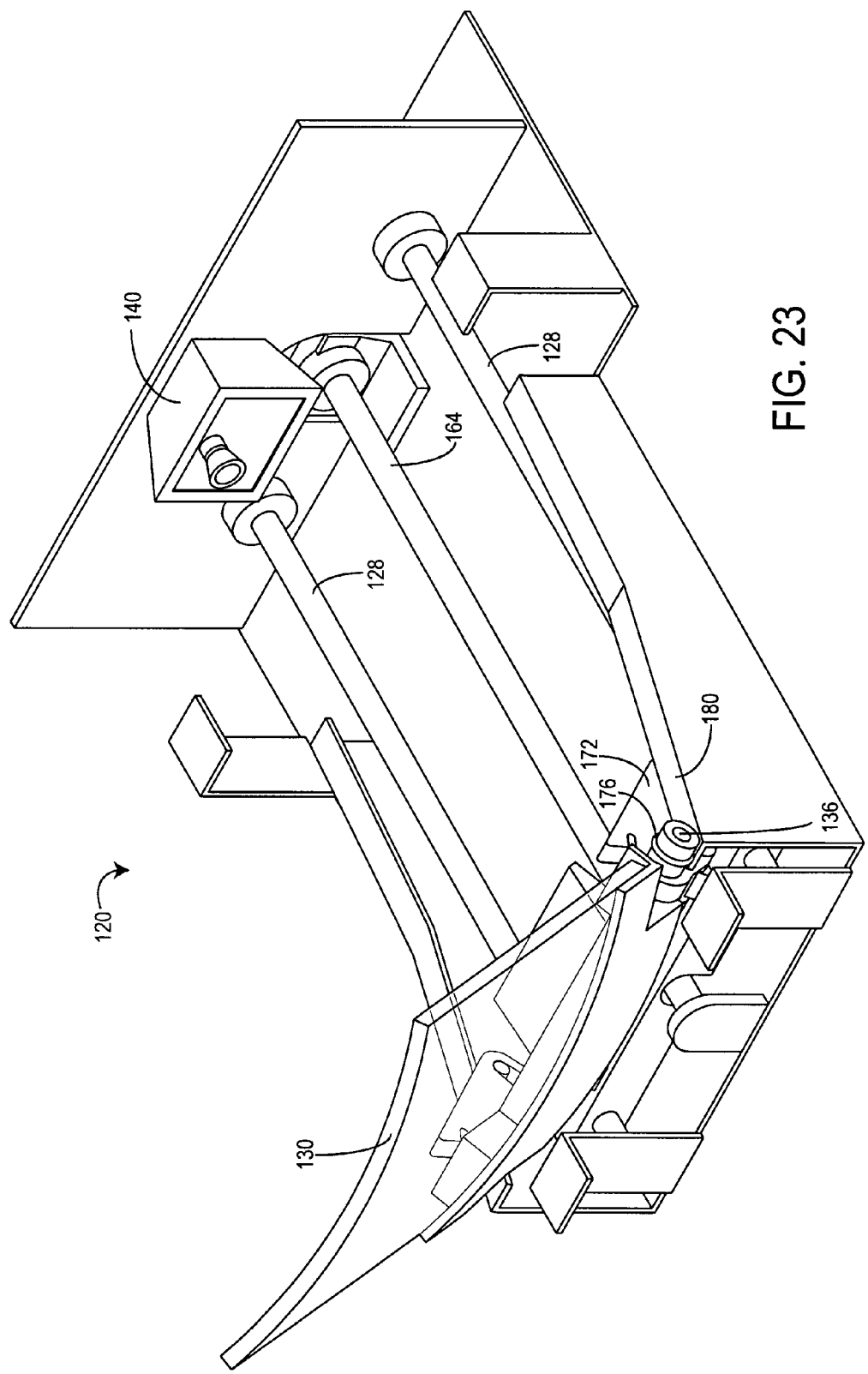
FIG. 23 is a perspective view of the display unit of FIG. 20, in an operational or open position, according to an exemplary embodiment.
Figure 24:
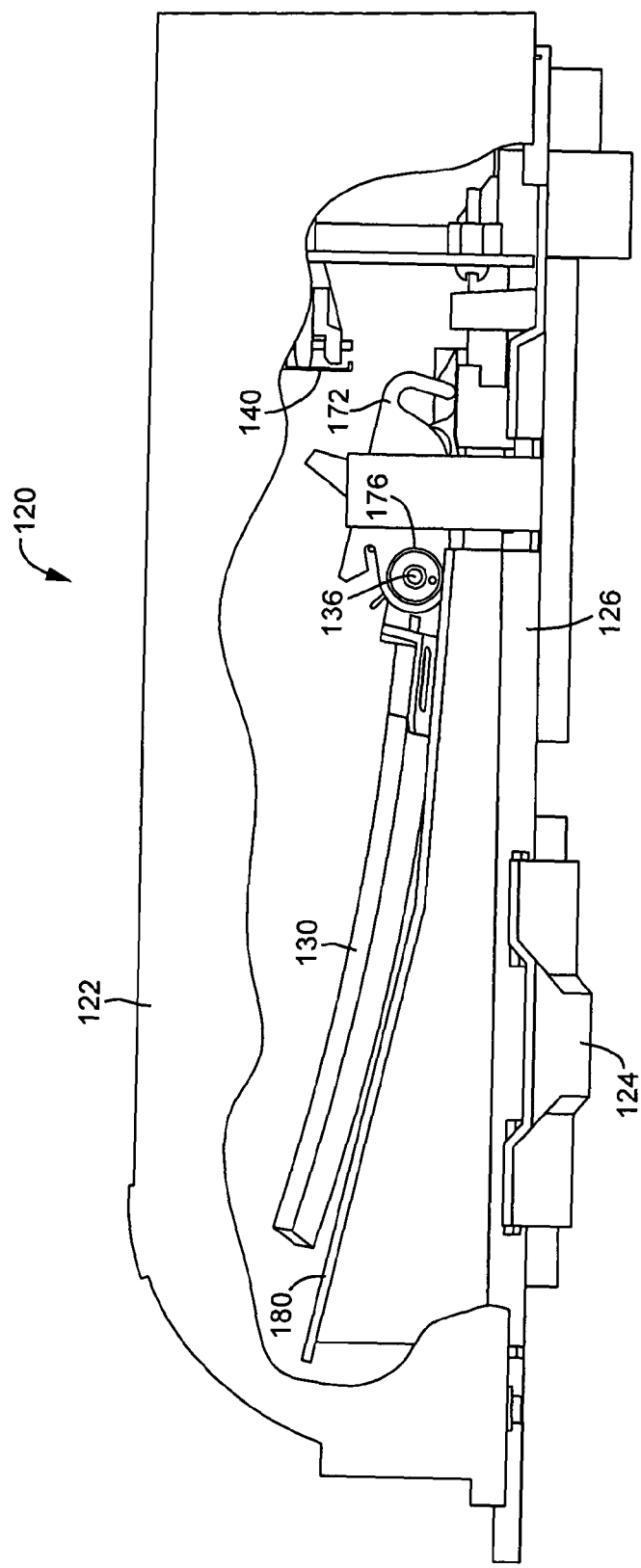
FIG. 24 is a side elevation view drawing of the display unit of FIG. 20, in a closed position, according to an exemplary embodiment.
Figure 27:
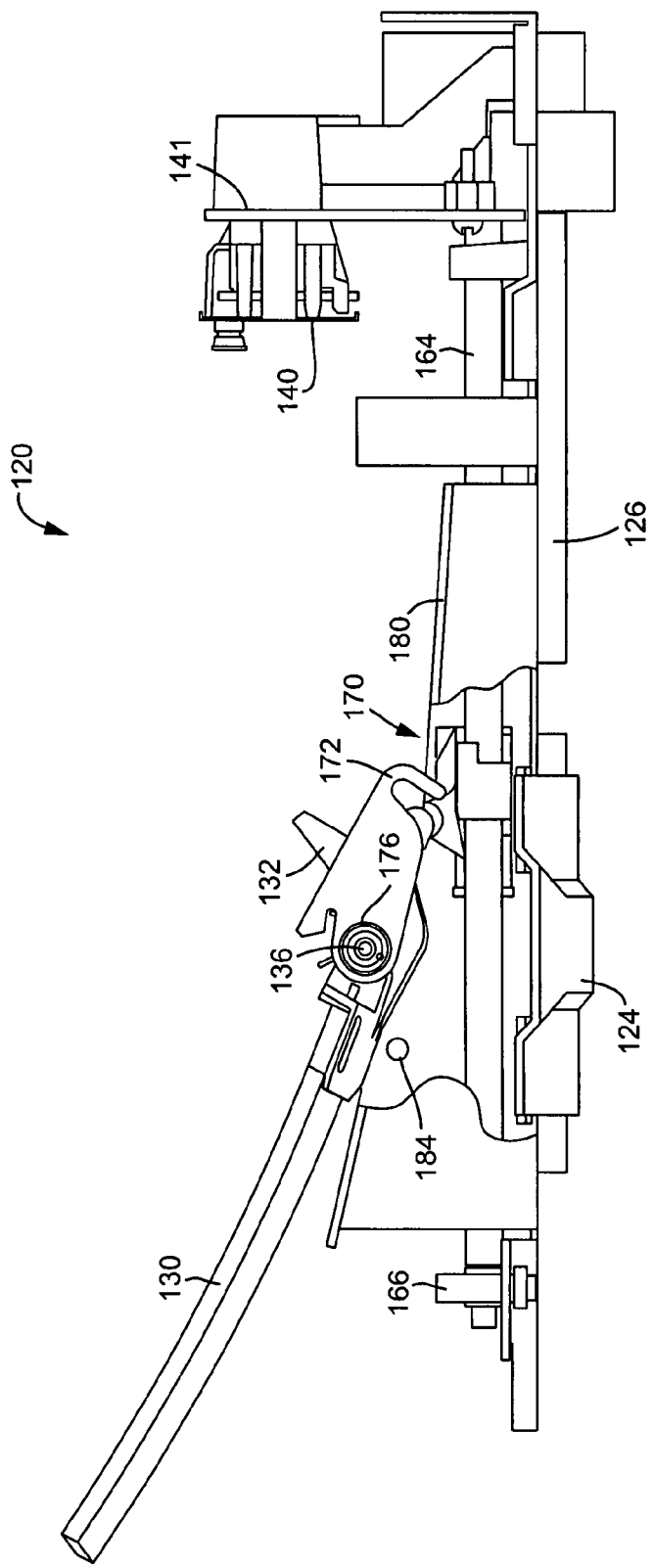
FIG. 27 is a partial side elevation view of the display unit of FIG. 20, the semi-reflective member is shown in an intermediate position, transitioning from a closed position to an open position, according to an exemplary embodiment.
Figure 28:
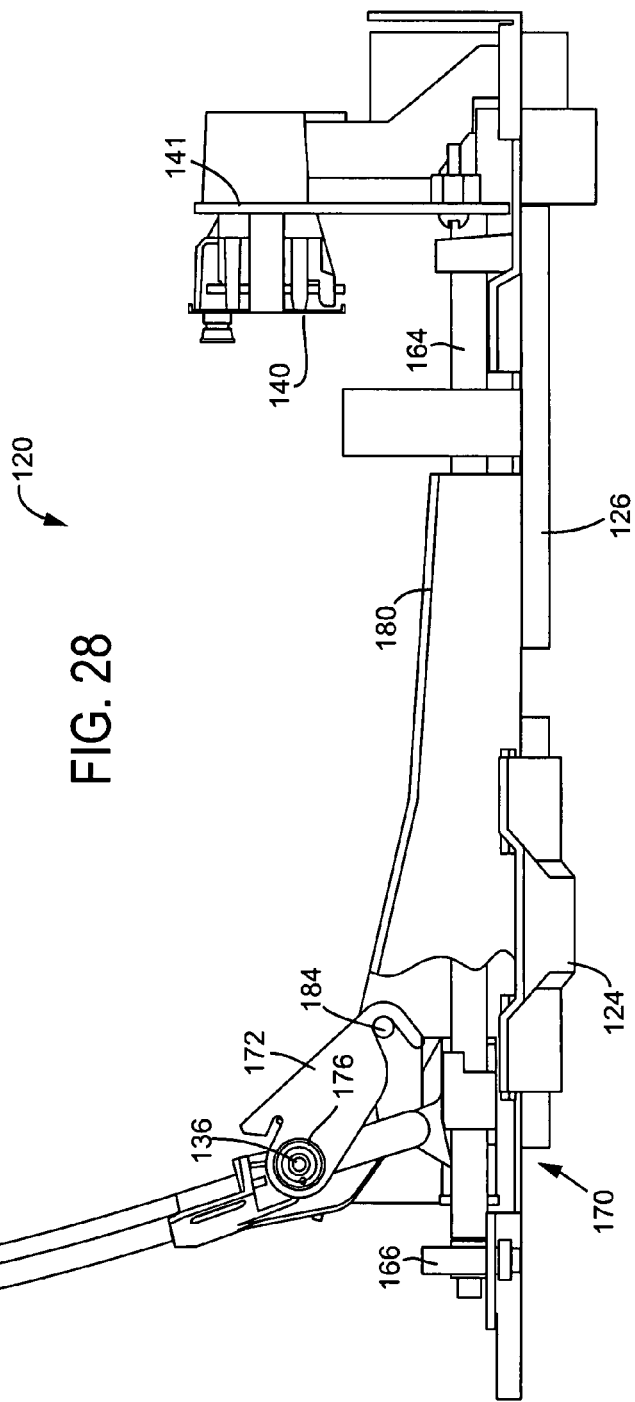
FIG. 28 is a partial side elevation view drawing of the display unit of FIG. 20 in an open or operational position, according to an exemplary embodiment.

Carriage 170 is generally configured to travel from a first distal end of display unit 120 (the end near image generator 140 and/or motor 162) to a second distal end of display unit 120 (the end near bearing 166). FIGS. 20 and 24-26 show carriage 170 at the first distal end (semi-reflective member 130 is in a non-operational position). FIGS. 21, 22 and 27 show carriage 170 at an intermediate position. FIGS. 23 and 28 show carriage 170 at the second distal end (semi-reflective member 130 is in an operational position).

Motor 162 is functionally coupled to threaded rod 164 such that threaded rod rotates when motor 162 is actuated. A threaded member 168 of carriage 170 is configured to operate with threaded rod 164 such that when threaded rod 164 rotates, threaded member 168 causes carriage 170 to move along threaded rod 164 (as threaded member 168 is configured not to rotate relative to carriage 170) in one direction or another. Biasing member 169 (e.g., a spring) may be provided to carriage 170 so that the position of threaded member 168 may be slightly adjusted relative to carriage 170 (and/or another threaded member).

At least one rail 180 is provided to display 120. Rail 180 may be coupled to a part of the vehicle and/or may extend from frame 126. Rail 180 is shown to extend diagonally relative to the threaded rod 164 and/or frame 126. Rail 180 is shown to ramp upward from frame 126. It is important to note that different rail orientations and/or shapes may be provided than those shown herein.

Carriage 170 and/or semi-reflective member 130 may include roller 176 configured to roll along and up and/or down rail 180. Roller 176 may be located at pivot 136 or otherwise. As carriage 170 is caused to move from the display end near image generator 140 to the display end near bearing 166, roller 176 causes semi-reflective member 130 to rotate from a closed or non-operative position (e.g., semi-reflective member 130 is near flat relative to frame 126 and/or rail 180) to an open or operative position (shown in FIG. 24) (e.g., semi-reflective member 130 is near parallel to the image providing surface of image generator 140).

One or more stabilizing elements 172 may be provided to extend from semi-reflective member 130, pivot 136, and/or carriage 170 to prevent carriage 170 and/or semi-reflective member 130 from moving too far in one direction (e.g., opening too far, traveling too near bearing 166). Stabilizing element 172 (e.g., hook, holder, etc.) may be configured to join, catch, meet, or latch to one or more elements 184 (e.g., pin, protrusion, etc.) when semi-reflective member 130 is moved to the operational position. When semi-reflective member 130 is not in an operational position (e.g., a closed position, an intermediate position), a biasing member 138 and/or gravity may hold stabilizing element 172 down and/or in a position so that stabilizing element 172 catches pin 184. When carriage 170 is moved from the operational position (e.g., the open position) back to a non-operational position (e.g., an intermediate position, a closed position), stabilizing element 172 pivots away from element 184 such that stabilizing element 172 is no longer hooked or held to element 184.

It is important to note that rods 128 shown in FIGS. 20-23 (e.g., guide members, etc.) may be provided to display unit 120. Rods 128 may be threaded and/or smooth and may provide stabilization to carriage 170. FIGS. 20 and 21 show biasing member 142. Biasing member 142 may function to hold holder 132 and/or semi-reflective member 130 down in a closed or non-operational position. Alternatively, biasing member 142 may be configured to assist with the upward movement or movement to an operational position.

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims.

It is important to note that the construction and arrangement of the display unit as shown in the various exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, the type of information displayed is not disclosed in a limiting fashion. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present inventions as expressed in the appended claims.

The invention claimed is:

1. A display unit for mounting in a vehicle, comprising:
   an image generator; and
   a semi-reflective member, configured to move from a non-operational position to an operation position, wherein the semi-reflective member is positioned to reflect light from the image generator in the operational position;
   a threaded rod rotated by a motor;
   a carriage having a threaded member, wherein the carriage is pivotably coupled to the semi-reflective member and the carriage is configured to move along the threaded rod by the rotation of the threaded rod;
   a frame comprising a first rail and a second rail that remain stationary as the semi-reflective member is moving;
   a first trolley device and a second trolley device configured to ride along the first rail and the second rail, wherein the first and second trolley devices are pivotably coupled to the semi-reflective member;
   wherein, as the carriage rides along the threaded rod and the first and second trolley devices ride along the first and second rails, the pivotal couplings of the carriage and the trolleys with the semi-reflective member are configured to cause the semi-reflective member to move longitudinally and rotationally into the operational position.

2. The display unit of claim 1, further comprising a housing that remains stationary as the semi-reflective member moves from the non-operational position to the operational position, wherein the motor remains stationary relative to the housing.

3. The display unit of claim 1, wherein the semi-reflective member is moved rotationally and longitudinally as the semi-reflective member is caused to transition from the operational position to the non-operational position.

4. The display unit of claim 1, wherein the housing includes a first door and a second door, wherein the first door covers a distal end of the semi-reflective member when in the non-operational position.

5. The display unit of claim 1, wherein the housing includes a first door and a second door, wherein the second door covers the image generator.

6. The display unit of claim 5, wherein the first door covers a distal end of the member when in the non-operational position, wherein the second door covers the image generator.

7. The display unit of claim 6, wherein the doors are pivotably coupled to at least one of the trolleys and the semi-reflective member and wherein the doors are configured to open, via the pivotal couplings, as the semi-reflective member moves to the operational position.

8. The display unit of claim 1, wherein the threaded rod rotates relative to the housing but does not change horizontal or vertical position relative to the housing; and wherein the threaded rod is substantially parallel to the semi-reflective member when the semi-reflective member is in the non-operational position and wherein the threaded rod is substantially perpendicular to the semi-reflective member when the semi-reflective member is in the operational position.

9. A method of using a virtual display device including a semi-reflective member and an image display, the method comprising:
   moving the semi-reflective member from a non-operational position to an operational position by rotating a threaded rod, thereby causing a carriage to ride along the threaded rod and causing first and second trolley devices to ride along first and second rails of the virtual display device;
   wherein, as the carriage rides along the threaded rod and the first and second trolley devices ride along the first and second rails, pivotal couplings of the carriage and the trolleys with the semi-reflective member cause the semi-reflective member to move longitudinally and rotationally into the operational position; and further comprising:
   displaying a virtual image by projecting an image to the semi-reflective member from the image display.

10. The method of claim 9, further comprising:
   opening at least one door on a housing; and
   opening at least a second door blocking an optical path between the semi-reflective member and the image display.

11. The method of claim 10, wherein opening the second door causes the at least one door to open.

12. The method of claim 9, wherein movement of the carriage and the semi-reflective member causes the at least one door on the housing and the at least a second door to open.

13. The method of claim 9, wherein the semi-reflective member and the at least one door are moved by a motion of a single motor configured to rotate the threaded rod.

14. A virtual image system for a vehicle, the virtual image system being disposed in or above a dashboard of a ground vehicle, the virtual image system comprising:
   a display; and
   a frame having rails and a threaded rod;
   a motor coupled to the frame and configured to rotate the threaded rod;
   a semi-reflective member configured to be caused to move longitudinally and rotationally by the motor's rotation of the threaded rod;
   wherein the movement is from a non-operational horizontal position to an upright operational position, wherein the upright operational position is substantially perpendicular to the horizontal position and the dashboard.

15. The virtual image system of claim 14, further comprising a housing, the housing comprising a first door and a second door, wherein the first door is opened to allow the semi-reflective member to be positioned at least partially outside the housing and the second door is moved to provide an optical path between the display and the semi-reflective member.

16. The virtual image system of claim 15, wherein the optical path does not include separate lenses.

17. The virtual image system of claim 15, wherein movement of the semi-reflective member on the rails causes the first door and the second door to open.

18. The virtual image system of claim 14, wherein the semi-reflective member rides on the rails via trolleys.

* * * * *

UNITED STATES PATENT AND TRADEMARK OFFICE
CERTIFICATE OF CORRECTION

| | | |
|---|---|---|
| PATENT NO. | : 8,077,396 B2 | Page 1 of 1 |
| APPLICATION NO. | : 12/515394 | |
| DATED | : December 13, 2011 | |
| INVENTOR(S) | : Jean-Luc Croy et al. | |

It is certified that error appears in the above-identified patent and that said Letters Patent is hereby corrected as shown below:

TITLE PAGE,

Item (75) Inventors: Please change "Phillipe Fedorawiez, Triel sur Seine (FR)" to -- Philippe Fedorawiez, Triel sur Seine (FR) --

Signed and Sealed this

Thirty-first Day of January, 2012

David J. Kappos
*Director of the United States Patent and Trademark Office*